US010887313B2

(12) United States Patent
Mitevski

(10) Patent No.: US 10,887,313 B2
(45) Date of Patent: *Jan. 5, 2021

(54) SYSTEMS AND METHODS FOR CONTROLLING SIGN-ON TO WEB APPLICATIONS

(71) Applicant: Nasdaq, Inc., New York, NY (US)

(72) Inventor: Vladimir Mitevski, Rockville, MD (US)

(73) Assignee: Nasdaq, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/526,490

(22) Filed: Jul. 30, 2019

(65) Prior Publication Data

US 2019/0356665 A1 Nov. 21, 2019

Related U.S. Application Data

(63) Continuation of application No. 15/973,771, filed on May 8, 2018, now Pat. No. 10,412,091, which is a continuation of application No. 15/342,923, filed on Nov. 3, 2016, now Pat. No. 9,985,972.

(60) Provisional application No. 62/252,295, filed on Nov. 6, 2015.

(51) Int. Cl.
*H04L 29/06* (2006.01)
*H04L 29/08* (2006.01)

(52) U.S. Cl.
CPC .......... *H04L 63/10* (2013.01); *H04L 63/0815* (2013.01); *H04L 67/02* (2013.01); *H04L 67/141* (2013.01); *H04L 67/143* (2013.01); *H04L 67/146* (2013.01); *H04L 67/42* (2013.01)

(58) Field of Classification Search
None
See application file for complete search history.

(56) References Cited

U.S. PATENT DOCUMENTS

| 9,118,657 | B1 * | 8/2015 | Shetty | H04L 63/0815 |
| 9,985,972 | B2 | 5/2018 | Mitevski | |
| 2006/0026260 | A1 | 2/2006 | Mullen et al. | |
| 2012/0210413 | A1 * | 8/2012 | Akula | H04L 63/0815 726/8 |
| 2013/0246943 | A1 | 9/2013 | Goodman et al. | |
| 2014/0006619 | A1 | 1/2014 | Hang et al. | |

(Continued)

FOREIGN PATENT DOCUMENTS

JP  2007-034956 A  8/2007

OTHER PUBLICATIONS

International Search Report and Written Opinion in related application PCT/US/16/60473 dated Jan. 30, 2017.

(Continued)

*Primary Examiner* — Shin-Hon (Eric) Chen
(74) *Attorney, Agent, or Firm* — Nixon & Vanderhye, P.C.

(57) ABSTRACT

The described technology provides a single sign-on capability so that a user who is already signed on to a web application from a client application may not be required to sign-on again when he/she later needs access to the web application from the same or another client application. The technology also provides a multiple login prevention capability to detect multiple sign-on events using the same credentials and disable one or more of the associated multiple sessions.

17 Claims, 11 Drawing Sheets

(56) References Cited

U.S. PATENT DOCUMENTS

2014/0096215 A1* 4/2014 Hessler ................ H04W 12/06
                 726/7
2014/0189840 A1  7/2014 Metke et al.
2014/0310173 A1 10/2014 Caldwell
2017/0111351 A1* 4/2017 Grajek ................ G06F 16/955
2017/0180351 A1* 6/2017 Lu ........................... H04L 67/02

OTHER PUBLICATIONS

International Preliminary Report on Patentability in corresponding PCT/US16/60473 Application dated Jan. 22, 2018.

* cited by examiner

SYSTEMS AND METHODS FOR CONTROLLING SIGN-ON TO WEB APPLICATIONS

CROSS-REFERENCE TO RELATED APPLICATIONS

This applications is a continuation of U.S. patent application Ser. No. 15/973,771 filed May 8, 2018, which is a continuation of U.S. patent application Ser. No. 15/342,923 filed Nov. 3, 2016 now U.S. Pat. No. 9,985,972 issued May 29, 2018, which claims the benefit of priority of the U.S. Provisional Application No. 62/252,295 filed on Nov. 6, 2015, the entire contents of which are incorporated herein by reference.

BACKGROUND

Web application deployments enable a large number of users to access one or more web applications and/or resources controlled by web applications. For example, a large corporation may deploy an enterprise software application ("web application") on one or more servers in its corporate network or other Internet-accessible computer, and enable all its employees and/or clients to access that application via the web. Web-accessibility of such applications provide employees and/or clients with the ability to access the application at any time and from anyplace where a client device has network connectivity.

Also, web applications are accessible using information processing devices of different types. The same user may sometimes access a web application using different information processing devices. For example, a user may attempt to access the web application using his smartphone while also simultaneously accessing it via a desktop computer. Sometimes the web application may be accessed by the same user using two different browsers (e.g., Chrome by Google and Internet Explorer by Microsoft).

Thus, web application deployments provide numerous benefits related to accessibility and availability. The capability for the same user to simultaneously access the web application using more than one device or one browser, and/or other client application, may improve aspects of a user's interaction with a web application, such as efficiency and convenience.

However, the increased convenience of web applications offered by advances in software technology and network technology, unless properly controlled, can also result in misuse of access privileges. For example, in the case of a web application for which a license or access fee is charged by the provider on a per user basis, some users may attempt to avoid paying the full fee by using another user's privileges to access the web application, thus potentially depriving the provider some amount of revenue. Such misuse of access privileges can also negatively affect the system capacity available for fee-paying users and/or negatively affect the system performance experienced by users.

Therefore, as more enterprise software applications of increasing commercial value are being deployed as web applications, technology is needed for improving accessibility of such applications and also for improving protection of application providers' resources.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

SUMMARY

The described technology relates to controlling access to web applications and resources controlled by such applications. The described technology provides a single sign-on capability so that a user who is already signed on to a web application from a client application may not be required to sign-on again when he/she later needs access to the web application from the same or another client application. The single sign-on capability can improve a user's experience associated with the web application by reducing the number of times the user has to go through the sign-on process. The described technology also provides a multiple login prevention capability for the server. The multiple login prevention can be used to detect potentially suspicious sign-on scenarios and disable one or more active sessions when a suspicious sign-on is detected.

This Summary is provided to introduce a selection of concepts in a simplified form that are further described below in the Detailed Description. This Summary is intended neither to identify key features or essential features of the claimed subject matter, nor to be used to limit the scope of the claimed subject matter; rather, this Summary is intended to provide an overview of the subject matter described in this document. Accordingly, it will be appreciated that the above-described features are merely examples, and that other features, aspects, and advantages of the subject matter described herein will become apparent from the following Detailed Description, Figures, and Claims.

DETAILED DESCRIPTION

The technology described herein relates to, among other subjects, controlling user access to one or more web applications. Some example embodiments provide a single sign-on (SSO) capability that provides users with the convenience of performing the login process once, and subsequent access to other aspects of the same application or related applications with reduced authentication or without requiring further sign-on actions to be performed. Some example embodiments may include a multiple login prevention (MLP) capability that may help protect revenue streams generated by web applications, and also help protect the processing capacity of the servers that run web applications. The MLP capability may be used, for example, to detect when the same identifier/credential (e.g., a user ID or credential of a particular user) is used to access a web application from multiple endpoints at the same time, and may act to cancel one or more sessions in order to reduce misuse of access capabilities to the web application. The SSO and/or MLP capabilities provided according to some embodiments, while improving efficiencies, speed of access and user convenience in any type of web application, may be even more beneficial in web applications with single page application (SPA) frameworks that provide users the ability to frequently and conveniently access a multitude of applications.

Figure 1:
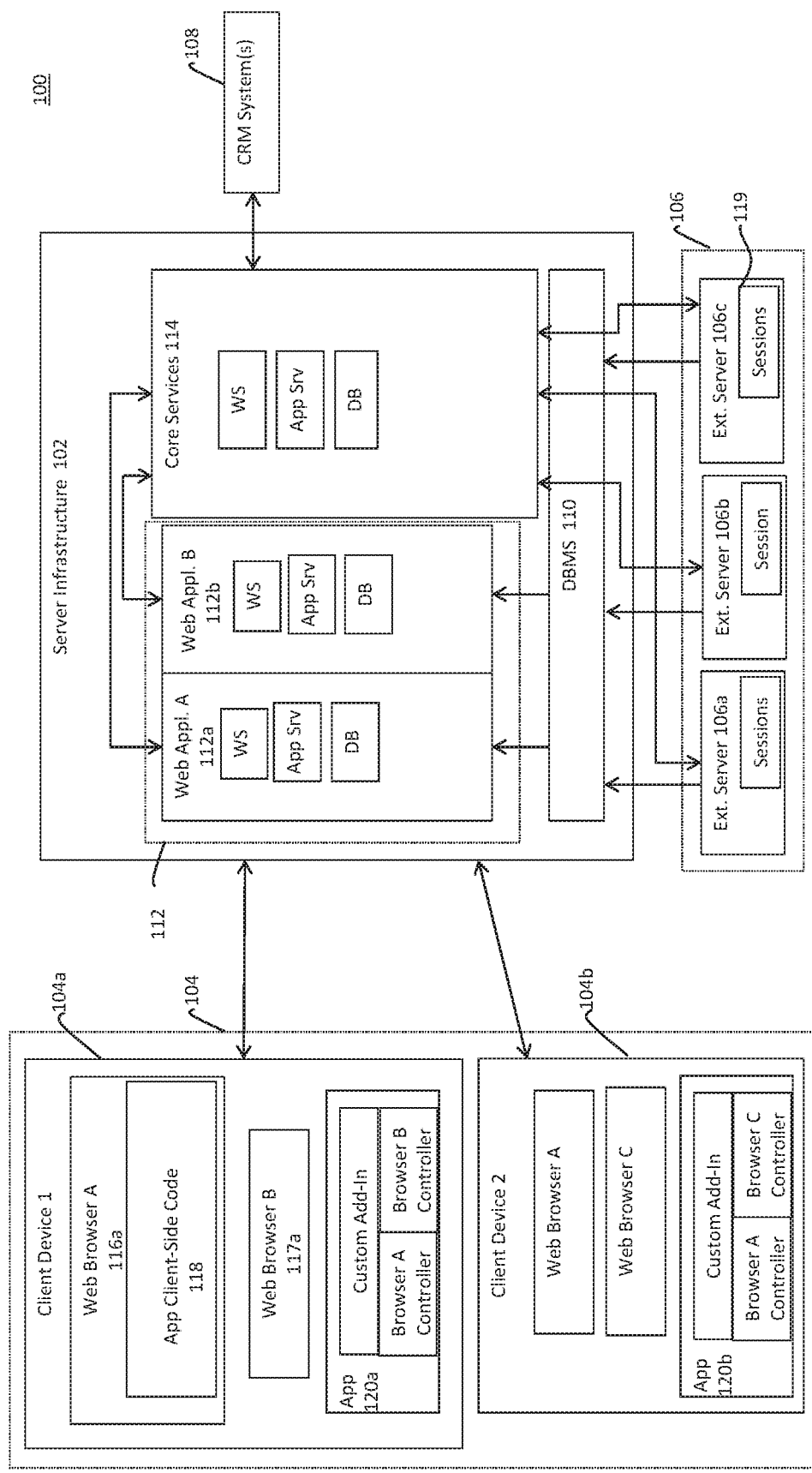
FIG. 1 illustrates a computing environment having one or more client devices, and one or more server devices executing web applications, according to some example embodiments.

FIG. 1 illustrates a non-limiting computing environment 100 including one or more servers 102 (also referred to herein as "server infrastructure") and one or more clients 104, according to some embodiments. The one or more servers 102 communicate with clients 104 and one or more external servers, so that users on clients 104 can access web applications 112 executed on the one or more servers 102. Servers 102 may also communicate with a document management system 108. The communication between the servers 102, clients 104, external servers 106, and document management system 108 may be over the internet or any other communication network.

Servers 102 may be implemented on one or more physical server computers that are communicatively connected to each other over a network. The one or more physical server computers may be geographically co-located or distributed. Servers 102 may include a database management system 110 and one or more server-side web applications 112 (e.g., 112a and 112b) and a core services application 114.

Each web application 112 may be designed and operated according to a three-tier model of a web server, application server and database. As in conventional systems, the web server of each web application 112 includes the capability to communicate with external entities via HTTP and other protocols such as JSON, HTML, XML, JavaScript, Cascading Style Sheets (CSS), etc. The application server of each web application 112 provides the processing logic for the application, and the database of each web application 112 provides for storing and reading data.

Web applications 112 may interact with the core services application 114 for managing user authentication, with clients 104 (e.g., 104a and 104b) for receiving input from and for transmitting out to, and the database management system 110 and/or external servers 106 for obtaining information to be provided to the requesting client applications running on clients 104. In some embodiments, some or all of the information provided to requesting clients may be generated by the web application itself and/or other web application executing locally on the same one or more servers 102.

Core services application 114, which may also be designed and operated according to the three-tier model described above, may provide one or more services that are commonly used by the web applications 112. Example services that may be provided by core services application 114 include authentication of users, management of sessions, etc.

In some embodiments, core services application 114 can also provide session management to the external servers 106. For example, in a use case where two or more web applications 112 obtain data from a particular external server 106, core services application 114 may provide the capability to manage sessions between servers 102 and the external servers 106 in accordance with corresponding other sessions between clients 104 and servers 102. Each external server may store a copy 119 of a part of a session table maintained at the server 102.

Web applications 112 operate to receive requests from clients 104, perform processing and/or obtain information from the database 110 and/or external servers 106, and respond to clients 104 with a result from the processing and/or obtained data. Web applications 112 may utilize core services 114 for administering users and user sessions.

A web application may comprise one or more client-side components and one or more server-side components. Client-side components of a web application may operate to provide for handling the user interface by performing presenting (e.g., displaying) of information on a user interface device; receiving user input, etc. Server-side components may provide for authentication, service metering, generating or obtaining information to be presented to the user in accordance with received user inputs.

Embodiments are not limited to particular types of web applications. Web applications that may be used in embodiments include those designed according to the single page application (SPA) model, any non-SPA model, or a combination of both.

SPAs are web applications that operate within a single web page. In an SPA, the content for a single web page is sent by the web server to the web browser, and that page is loaded/rendered, as described above with the traditional web application. Subsequently, when the user wants to view different content within the application, the user will click a hyperlink or input on the page. But instead of navigating to a different page as in non-SPA web applications, the same page will remain loaded, and its content will be dynamically updated. This dynamic updating may be accomplished in a number of different ways; it may involve, for example, the web browser performing background HTTP fetches for new content, updating the Document Object Model (DOM) of the page (via JavaScript code), and/or other techniques.

AngularJS® is a web application framework that is used to create SPAs. At the web browser, AngularJS JavaScript libraries are loaded and interpret HTML templates which are embedded with AngularJS scripts and other AngularJS coding constructs, such that the resulting pages behave as defined in the templates. Other frameworks (e.g., Backbone.js, Ember.js, and React) may also be used for SPA applications.

In some non-SPA web application models, a web application includes a number of different web pages. To render a particular web page within the application, the following set of interactions is performed: a web browser at a client device requests (using an Hypertext Transfer Protocol (HTTP) message) a particular web page from a web server; in response, the web server transmits (using HTTP) the code for the page back to the web browser, the code including, e.g., HTML, JavaScript®, and Cascading Style Sheets (CSS) code; the web browser then loads the code and renders the page, thereby enabling a user to view and interact with the page. When the user subsequently wants to view different content within the application, the user will click a hyperlink or input on the page that points to a different page within the application, and then the above-mentioned request/response/load/render procedure is performed for the different page.

The database management system 110 (sometimes also referred to herein simply as the database), may be a commercially available DBMS, or other data record management system. Although shown as a single DBMS, DMBS 110 may include one or more separate databases. Embodiments are not limited to any type of database management system.

Clients 104a and 104b can be configured to execute the same or different client applications. In the illustrated example embodiment in FIG. 1, first clients 104a includes a web browser A 116 and a web browser B 117. Client 104a may also have stored on it a client-side app 120a which is a native app. When browser A 116 is used to access a web application 112, client-side code 118 for a web application 112 executed within browser A 116. In the same example embodiment, the second client 104b is configured to execute an app 120b which may be a native app. Client 104b may have browsers (e.g., as shown browser A and browser C) in addition to the native app 120b. The client-side code 118 and app 120 may perform client-side processing for a corresponding web application on server 102.

As illustrated in FIG. 1, when a client application (e.g., 116/118 or 120a/120b) communicates with a web application 112, the web application 112 may obtain any information requested by the client from one or more external servers 106 and provide to the client application. In some embodiments, some or all of the information provided to the requesting clients 104 may be generated locally by servers 102.

Clients 104 may include personal computers, mobile computers, tablets, smartphones, and other electronic devices. In some example embodiments, any electronic computing device including at least a display, an input device for user input, and a communication interface for communicating with the server device may operate as a client device.

The external servers 106 (e.g., 106a, 106b, 106c) may include one or more servers controlled by an entity (e.g., administrative entity) different from the entity controlling the one or more servers 102. For example, one or more of the external servers 106 may be managed by a service provider or vendor that, under a predetermined (e.g., previously agreed upon by an enterprise and a vendor) service specification, provides users on client devices 104 access to various application data and/or analysis. The service specification may be based upon one or more of a number of users, type and amount of information, duration of use, frequency of use etc., of the access to the external servers.

It should be understood that the software modules shown in FIG. 1 are stored in and executed by hardware components (such as processors and memories); and it should be further understood that, whenever it is described in this document that a software module performs any action, that is done solely for ease of description, and the action is in actuality performed by the underlying hardware according to the instructions and data that comprise the software module. Further details regarding example hardware components that may be used to implement the features described herein are provided below with reference to FIG. 10, as well as in other places in this document.

In an example implementation, the computing environment 100 may be associated with an enterprise, such as, for example, Nasdaq Corporation. Example web applications 112 may include real-time market analysis application and a client account status application. Users of the web applications 112 may include financial analysts or other employees of the enterprise. The core services application 114 may provide common services such as administration (e.g., creating user accounts, administering entitlements, etc.) authentication (e.g., create/manage sessions for users to access certain services, etc.) and authorization (e.g., check whether user is entitled to access certain services or features, etc.) for users. The servers 102 may represent one or more servers and the associated infrastructure used by the enterprise for running the web applications 112, core services application 114 and associated software. The document management system 108 may include a customer relationship management application that communicates with the web applications and/or core services application for delivering services to the corporation's users.

In this example implementation, the external servers 106 each may be operated by a respective vendor of application data. Each vendor may provide application data such as real-time financial market related information to entities such as Nasdaq Corporation under some sort of service specification (e.g., an agreed price based upon type of data, amount of use, number of users, etc.).

When an analyst using client 104a accesses the real-time market analysis application on servers 102, an SPA may be displayed on the client device, and various real-time or value-added information from the vendors (e.g., such as those operating external servers 106) and/or the corporation's internal analysts etc., can be displayed in the one or more portions of the displayed SPA.

The external servers 106 (e.g., vendors), although providing the information requested and capable of identifying the users accessing its services, may rely upon the enterprise (as the "vendor of record") to ensure its user's compliance with the terms of use specified, for example, in a service specification agreed between the enterprise and the vendor. For example, based upon the agreement with a particular vendor, the core services application may be used to assign entitlements (a specification of type/amount of data accessible and other restrictions, if any) to the users and/or web applications to access/obtain data from that particular vendor. Core services 114 may establish sessions with the vendor for respective users who have a valid entitlement to that vendor's data. Core services 114 may cause, or may maintain, a session table (e.g., 116) at each vendor. When a user of a client device 114 requests data from the vendor, for example, through one of the web applications on server 102, the vendor may, in some embodiments, check its copy of the session table and request core services 114 for verification that the requesting user's entitlement is valid, and would provide the requested data if the entitlement is valid.

Figure 2:
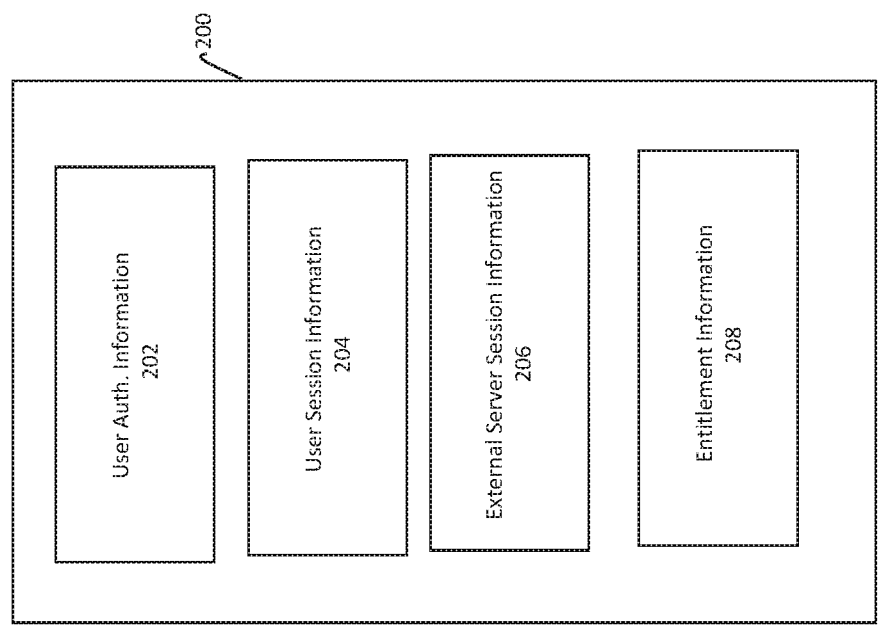
FIG. 2 illustrates some of the data tables that may be maintained by the one or more servers of FIG. 1, according to some example embodiments.

FIG. 2 illustrates an example collection of data tables 200 that may be maintained by and/or is accessible to core services application 114, according to some example embodiments. Although referred to as "tables", the data discussed in relation to FIG. 2 may be stored in any form or data structure accessible to the core services application 114 and/or other application configured to make use of the data.

User authentication information 202 may include a table of user authentication information, that is accessed by the core services 114 in order to authenticate a user during, for example, sign-on to one or more of the web applications. For each user, identifying information, such as, for example, any of user Id, password, user-specific cookies, and entitlements associated with the user etc. may be maintained in user authentication information 202.

User session information 204 includes a record of the currently active sessions by which users, such as users on client devices 104, communicate with a web application on server 102. User session information 204 may be in the form of a table with each row representing an active session. In some embodiments, inactive sessions (e.g., recently deactivated/cancelled sessions) too may also be in the table. The user session information table 204 may include, for each session, fields/columns such as user Id, web application for which the session serves, client, authenticated session identifier and/or one or more cookies. The table may also include start and end times for the session, and a current status. The status may, for example, indicate whether the session has been terminated or is currently active, and if terminated, a reason for the termination (e.g., terminated due to MLP).

External server session information 206 stores the user sessions pertaining to the respective external servers 106. In some embodiments, external server session information 206 may be maintained in data structures per external server 106. In some embodiments, each table 206 can be provided to the corresponding external server 106 so that the permissions and/or entitlements associated with a request can be checked locally by the external server when the request is serviced. In some embodiments, sessions between the server device 102 and external servers 106 may be based on user session information 204, and a separate table may not be necessary.

Entitlement information 208 includes information regarding entitlements associated with access to the web applications. Entitlements, as described above, specify the scope of access to one or more external servers (or other resources) for a user or group of users. For example, entitlement information 208 may specify the external servers (vendors) and the types of data to which each user or group of users have access. Entitlements may also specify whether simultaneous access by more than one client application (e.g., simultaneous access via a browser and a native app) by the same user is allowed for a particular web application.

Figure 3:
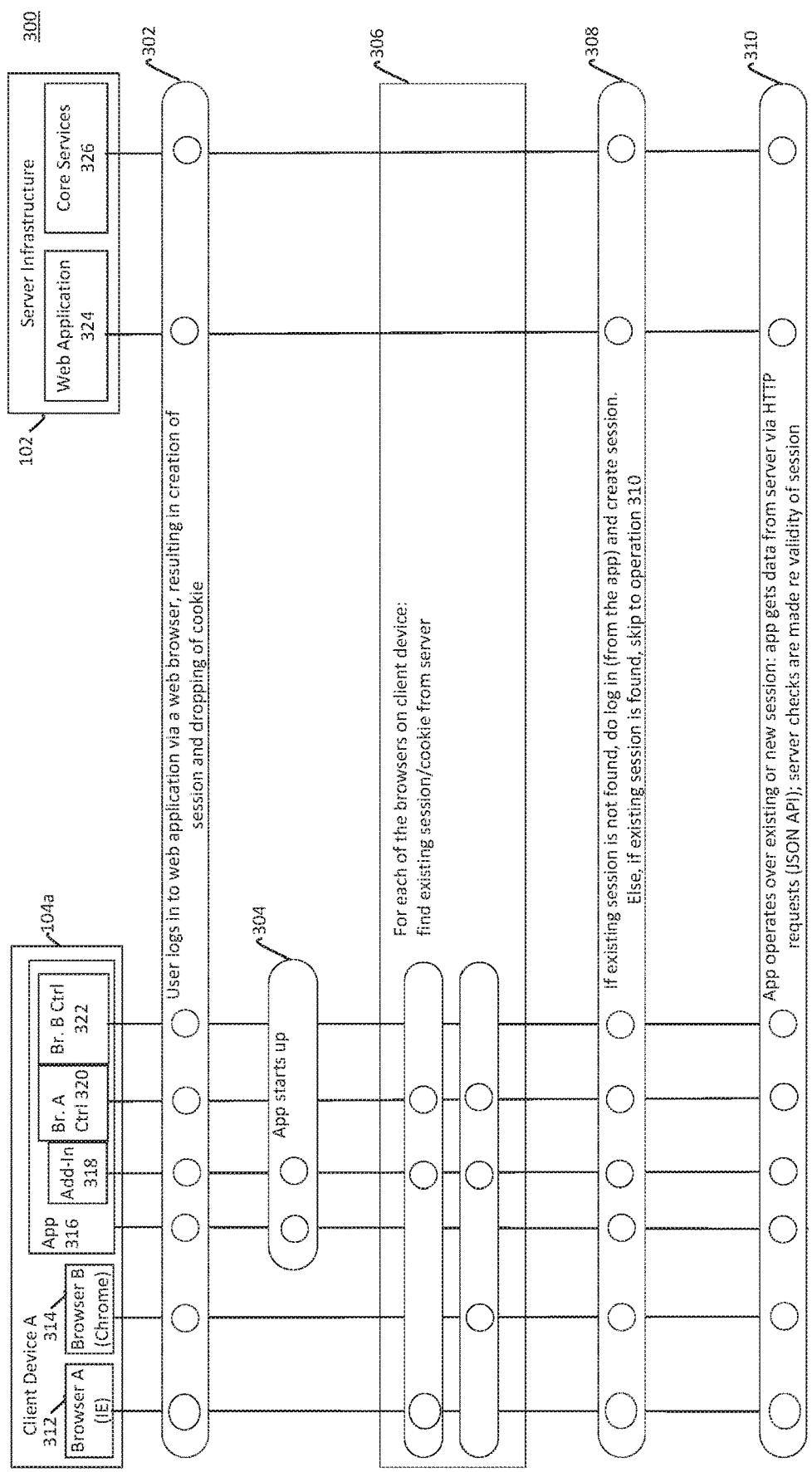
FIG. 3 illustrates a flow diagram showing interactions between a client device and a server device when a single sign-on operation is performed, according to some example embodiments.

FIG. 3 is a flowchart illustrating interactions between a client 104a and servers 102 that may occur in a single sign-on process 300 for a user on client 104a, according to some example embodiments.

Process 300 may be entered when a user using client 104a navigates a browser to a web application executing on servers 102. For example, the user may enter into the web browser, a predetermined URL (uniform resource locator) for accessing the web application. Alternatively, the browser may be directed to the web application when the user "clicks" on a link displayed on a web page. The web page of a web application encountered upon first arrival to the web application is referred to as the "landing page".

Having navigated to the landing page of the web application using the web browser (e.g., Internet Explorer browser 312), at operation 302, the user is signed-on (also referred to as "logged in") to the web application (e.g., 324).

Figure 5A:
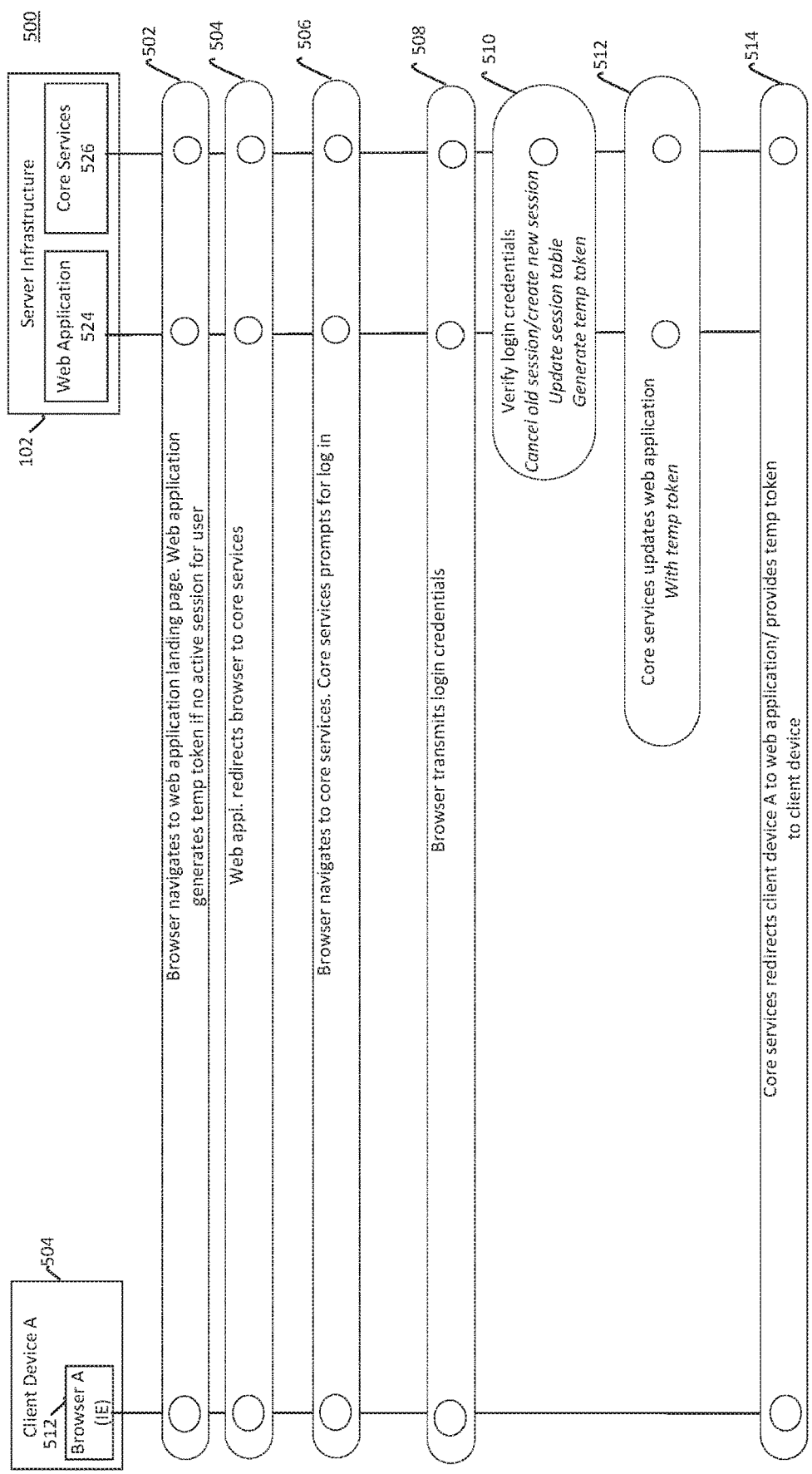
FIG. 5 (FIG. 5A and FIG. 5B) illustrates a flow diagram showing interactions between a client device and a server device when a user is signed-in, according to some example embodiments.
Figure 5B:
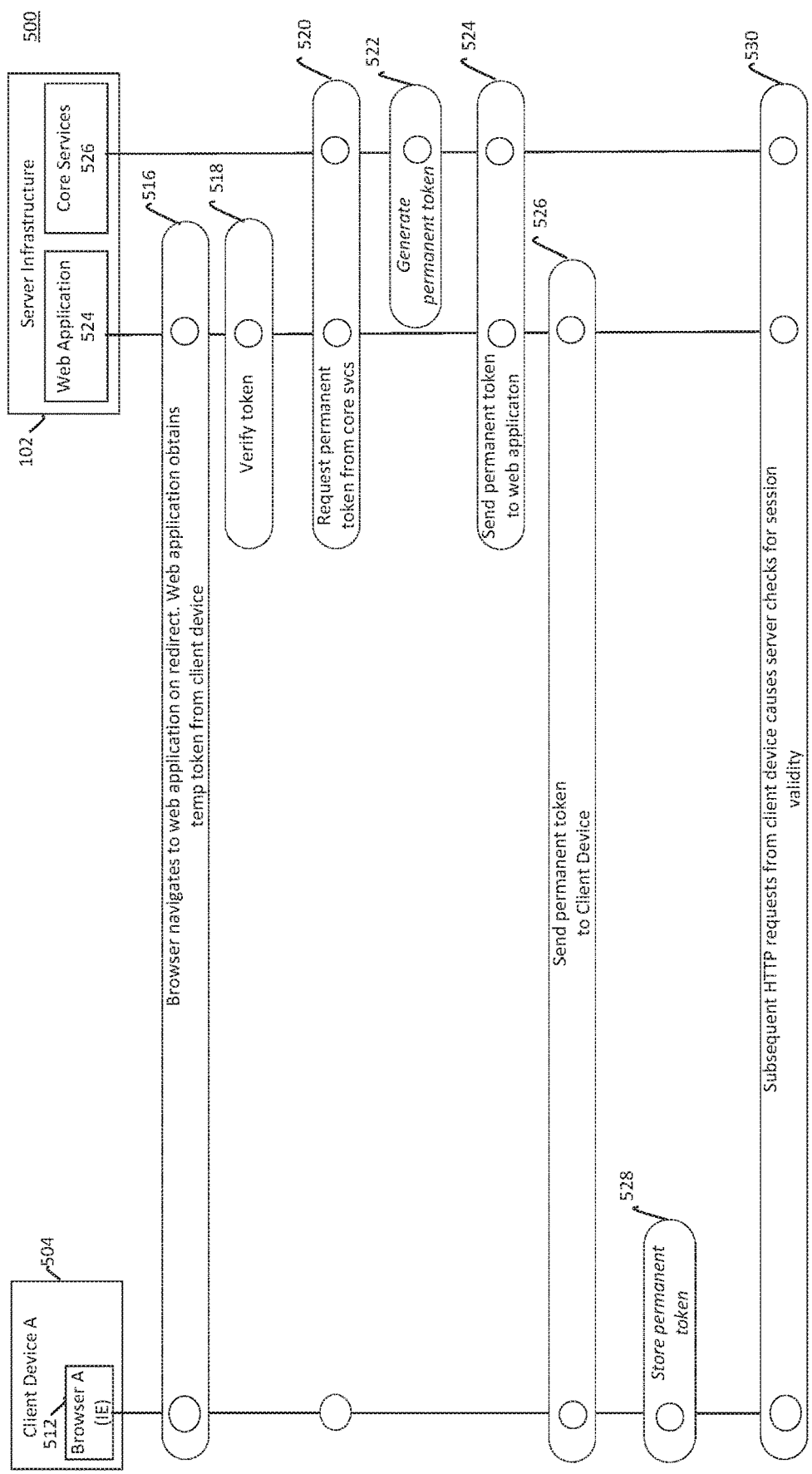

The sign-on process is described in more detail below in relation to FIG. 5. The sign-on process for the user, when successful, results in the creation of a session and the generation of a cookie. The creation of a session includes adding an entry to a session table, such as, for example, user session information 204. The cookie may be unique to the created session, and may be a text string generated using conventional techniques. The cookie is returned by server 102 to client 104a, and is saved at client 104a for future use. Subsequent requests (e.g., HTTP requests) by the user using client 104a to web application 324 includes the cookie, and server 102 may use the received cookie for keeping track of related requests. At this point the user is properly signed-on to the web application, and a client-side portion of the web application operating in the browser content can exchange messages and/or data with the server-side portion of the web application.

Operation 302 is illustrated in FIG. 3 with the flow lane of browser A 312 and the flow lanes of web application 324 and core services 326 marked with a solid-lined circle, whereas the flow lanes of browser B 314 and app 316 have respective dashed-lined circles. A solid-lined circle in a flow lane in an operation such as operation 302 is indicative that the system component corresponding to the flow lane actively participates (e.g., exchange messages with another system component) in this operation. Moreover, although it is generally the case that operations are ordered from the top to the bottom of the page according to the order of occurrence in time, in some embodiments one or more of the operations may occur concurrently. Some embodiments may include additional one or more operations not shown in the figures, and/or may not include one or more operations shown. This manner of illustrating system components level of activity in certain operations is used for FIGS. 3-6.

At operation 304, a second client application (e.g., 316), for example, a native app 316 is started on the client 104a. The native app 316 is an application that accesses the web application 324 on server 102. According to some example embodiments, the native app is a spreadsheet application (e.g., Microsoft Excel) that, during operation, acquires and/or exchanges data from/with the web application 324 on servers 102.

The native app 316 may be configured to use any of one or more browser controllers for communicating with server 102 via, for example, HTTP, for example, by exchanging HTTP messages with the web server associated with the web application 324. One or more browser controllers may be available to the native app. A browser controller provides a capability for an application, such as an Excel program, to utilize HTTP, JSON and/or other protocols used for control and data exchange over the web. For example, the native app may incorporate commercially or freely available browser controllers for one or more of Internet Explorer, Chrome, Firefox, Safari, etc. The native app may also include a customized add-in component (e.g., 318) that provides capabilities associated with the SSO function. Add-in 318, for example, enables an Excel spreadsheet in the native app 316 to interact, using one or more browser controls, with web application 324. In some example embodiments, the custom add-in 318 is created using Microsoft Automation or Microsoft COM.

After the native app 316 is started, at operation 306, the native app identifies if there is at least one existing session for any browser (e.g., 312 and 314) installed on the client. The native app may be made aware of the browsers available on the client by any technique such as searching the client storage during at install and/or application startup in known locations of the directory structure for each particular browser, a predetermined configuration, etc. Alternatively or additionally, the native app may identify and automatically incorporate a browser controls (e.g., 320 and 322) for each browser that is installed on the client. According to an embodiment, the custom add-in 318 iterates through the browser controllers that are available for the native app's use. For example, for each available browser controller, taken in a configurable predetermined order or in the order in which the browser controller is discovered by the native app 316, the native app instantiates the browser controller and transmits an HTTP request to the server 102. The request may identify all or a combination of, the user, the client device, web application, and the browser corresponding to the currently selected browser control. This process is repeated until either a browser type for which a session already exists or all browser types have been explored without finding an already existing session. Further details in relation to identifying a browser type for which a session already exists can be found below in relation to FIG. 7.

When the server 102 receives a request from client 104a, it determines whether an active session that corresponds to the information provided (e.g., corresponding to any one or a combination of a cookie included in the HTTP request, the user, the client, web application, and the browser) with the received request exists. The determination may be made by searching the session table to identify a corresponding session. In an example embodiment, a cookie created at the time when the session is established is sent by the client in each subsequent HTTP request to the server, and the server uses the received cookie to uniquely identify the corresponding session in the session table. If it is determined that a corresponding session is currently active, the session information and/or a cookie associated with the corresponding session is returned to the native application.

If it is determined, at the server, that no corresponding session exists for a received HTTP request, then the server returns a notification to that effect to the native application. In some example embodiments, for example, an HTTP redirect (e.g., "302 redirect") message is returned. The native application, upon receiving a notification that the previous HTTP request did not result in identifying an existing connection, forms a new HTTP request including information regarding the next browser in the list of browsers to be tried.

If, no existing session is found corresponding to any of the browser controls available to the native app, then at operation 308, sign-on is successfully performed and a new session and associated cookie is created. Sign-on is further described in relation to FIG. 5 below.

Subsequently, at operation 310, the native app operates using either the already existing session identified at operation 306 or the newly created session (created at operation 308). The operation of the native app may involve transmitting HTTP requests for data required for the native app and receiving such data in HTTP/JSON format. However, native apps are not limited to using HTTP/JSON for communicating with server-side applications such as web application. When the server device receives a request for data from the web application, the validity of the session may be checked.

Figure 4:
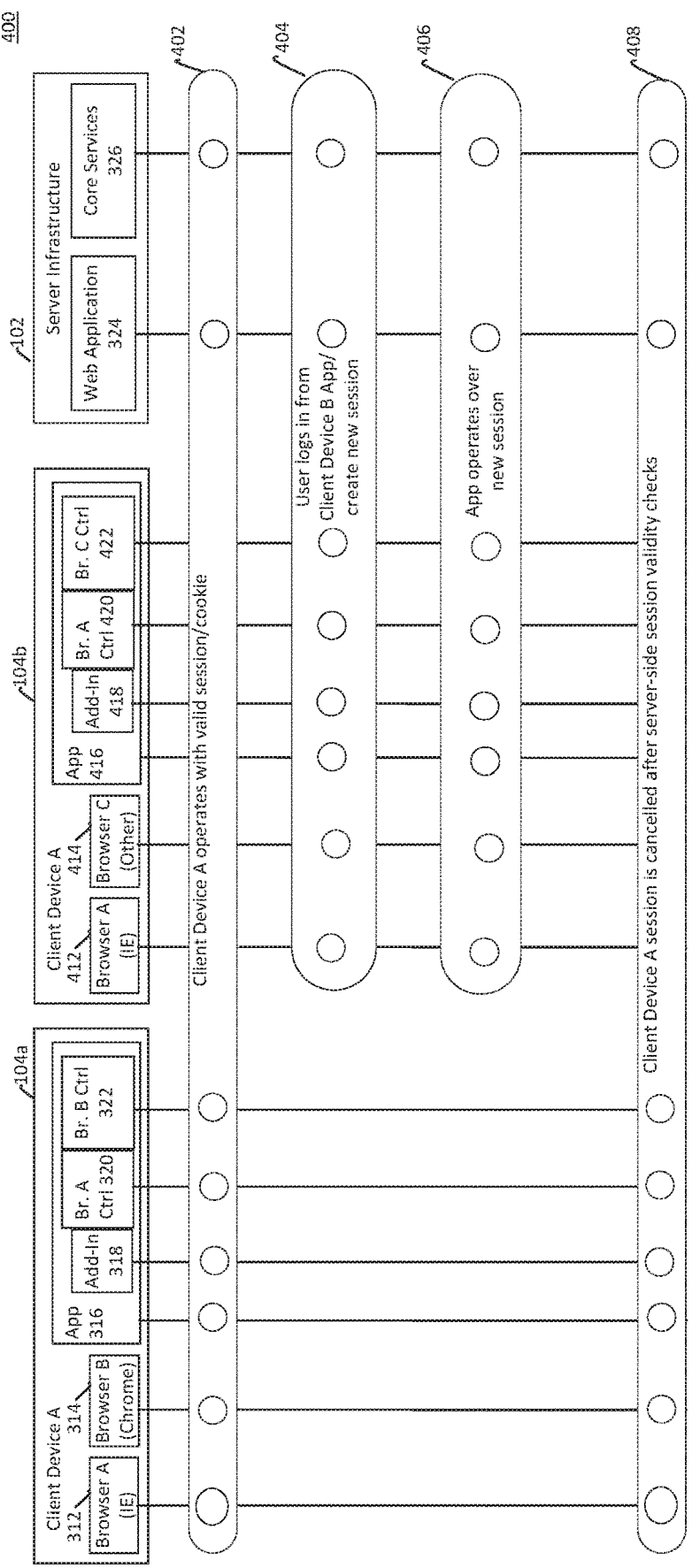
FIG. 4 illustrates a flow diagram showing interactions between client devices and a server device when a multiple login prevention operation is performed, according to some example embodiments.

FIG. 4 illustrates interactions between a client device 104a, client device 104b and a server device 102 that occur when a multiple login prevention (MLP) process 400 is performed. Process 400 may be commenced, for example, when a user already logged in from one client device (e.g., client device 104a) to access a web application (e.g., 324), signs in from a second client device (e.g., client device 104b) to access the same web application.

Operation 402 represents communication between the user on client device 104a and the web application on server device 102 over an established session using a valid cookie. As illustrated, one of the browsers and/or the native app on client device 104a may perform the communication over the established session.

At some point while operation 402 is ongoing, at operation 404, the user signs-on on client device 104b. For example, the user may log in via the native app on client device 104b.

At operation 406, the native app on client device 104b communicates with the web application on the server device by transmitting HTTP requests and receiving JSON formatted data. As noted above, server-side checks on the validity of the session are made before requested data is sent to the requesting native app. Further description of accessing provider data and the authorization associated with that access is provided below in relation to FIG. 8.

Operation 408 represents the cancelling of the session between client device 104a and server device 102. The cancelling of the earlier existing session may be performed at substantially the same time as when the new session is created. After the session for client device 104a has been cancelled, subsequent HTTP requests from client device 104a for data from the web application fails. The client device 104a user interface may be updated to indicate the failure to any longer obtain data from the web application and/or to notify the user that the session to client device 104a has been cancelled due to login from another location.

FIG. 5 illustrates interactions between a client device 504 (e.g., similar to client devices 104a, 104b) and a server device 102 that occur while performing a sign-on process 500 according to some example embodiments.

Process 500 may be commenced when the user navigates the browser to a so-called "landing page" for the web application. For example, for a web application named "IR Insights", the landing page may be at an address such as irinsight.nasdaq.com known to the user. The navigation may be performed by entering a URL for the landing page, or by clicking on a corresponding link from another web page.

At operation 502, when the browser on the client device navigates to the landing page, the web application determines if a corresponding currently active session and cookie exists. If an active session (and/or cookie) is not found, then the web application may generate a temporary token and send the token to the client device. In some embodiments, the temporary token may be pushed to the client along with the domain cookie for the web application.

At operation 504, the web application redirects the client device to a login application. According to an embodiment, the redirection is performed by sending to the client a 302 HTTP redirect message directing the browser on the client device to the login application. A known identifier for the web application can be passed with the redirect message, so that the login application can subsequently, after the login process is complete, redirect the client back to the web application. According to an embodiment, a globally unique identifier (GUID) assigned to the web application can be used as the identifier passed with the redirect messages.

At operation 506, the browser, having received the redirect message from the web application, navigates to the login application at the address indicated in the redirect message. When accessing the login application, the browser may identify the web application (which redirected the browser) by including the corresponding GUID in the HTTP request. The login application prompts the user for login credentials. According to an embodiment, the login credentials include a username and password.

At operation 508, the client transmits the login credentials.

At operation 510, the login application verifies the login credentials. For example, the username and password is verified against stored login and/or authentication information. After the user login is authenticated, one or more currently existing sessions may be cancelled so that the relevant service specifications are not violated. According to an embodiment, existing sessions for the user to access the web application may be cancelled. For example, a first-in-first-out (FIFO) policy may be implemented with respect to cancelling sessions when new sessions are established. Thus, for example, if the service specification limits the number of client applications that can access the simultaneously access a particular web application to one, then, when the new session is created, the earlier established session is cancelled. In another embodiment, existing sessions of the user for accessing the web application are cancelled if they are in the same "realm" associated with the new sign-on. A "realm" is a construct used to group GUIDs and/or GUID-client combinations. For example, by arranging particular combinations of web application 324 and client types (e.g., desktop computer, smartphone) into different realms, simultaneous sign-on to the same web application 324 by the same user on a desktop computer and a smartphone may be permitted.

At operation 512, the login application provides the web application with a temporary token. This may be performed using HTTP POST message, with the temporary token specified in key/value pair form. In some embodiments, an anti-forgery token can be provided along with the temporary token.

At operation 514, the login application redirects the client to the web application using an HTTP redirect message and the identifier (e.g., GUID) of the web application received earlier. The login application may also generate a cookie containing the temporary token. In some embodiments, the cookies may also include the anti-forgery token.

At operation 516, the client, having been redirected by the login application, navigates to the web application and presents to the web application the one or more cookies containing the temporary token.

At operation 518, the web application verifies the token.

At operation 520, the web application requests the login application to generate a permanent token.

At operation 522, the login application generates a permanent token.

At operation 524, the login application returns the generated permanent token to the web application.

At operation 526, the web application transmits the permanent token to the client.

At operation 528, the client stores the permanent token for future use. In some embodiments, the permanent token is used as the cookie for identifying the corresponding session.

Operation 530 represents the subsequent process of HTTP requests by the client, and the server device's return of requested data using HTTP/JSON or other format messages. The web application may check for the ongoing validity of the permanent token before returning requested data. In some embodiments, for example, for every data request by a client, the web application and/or the corresponding external server checks the validity of the session.

Figure 6:
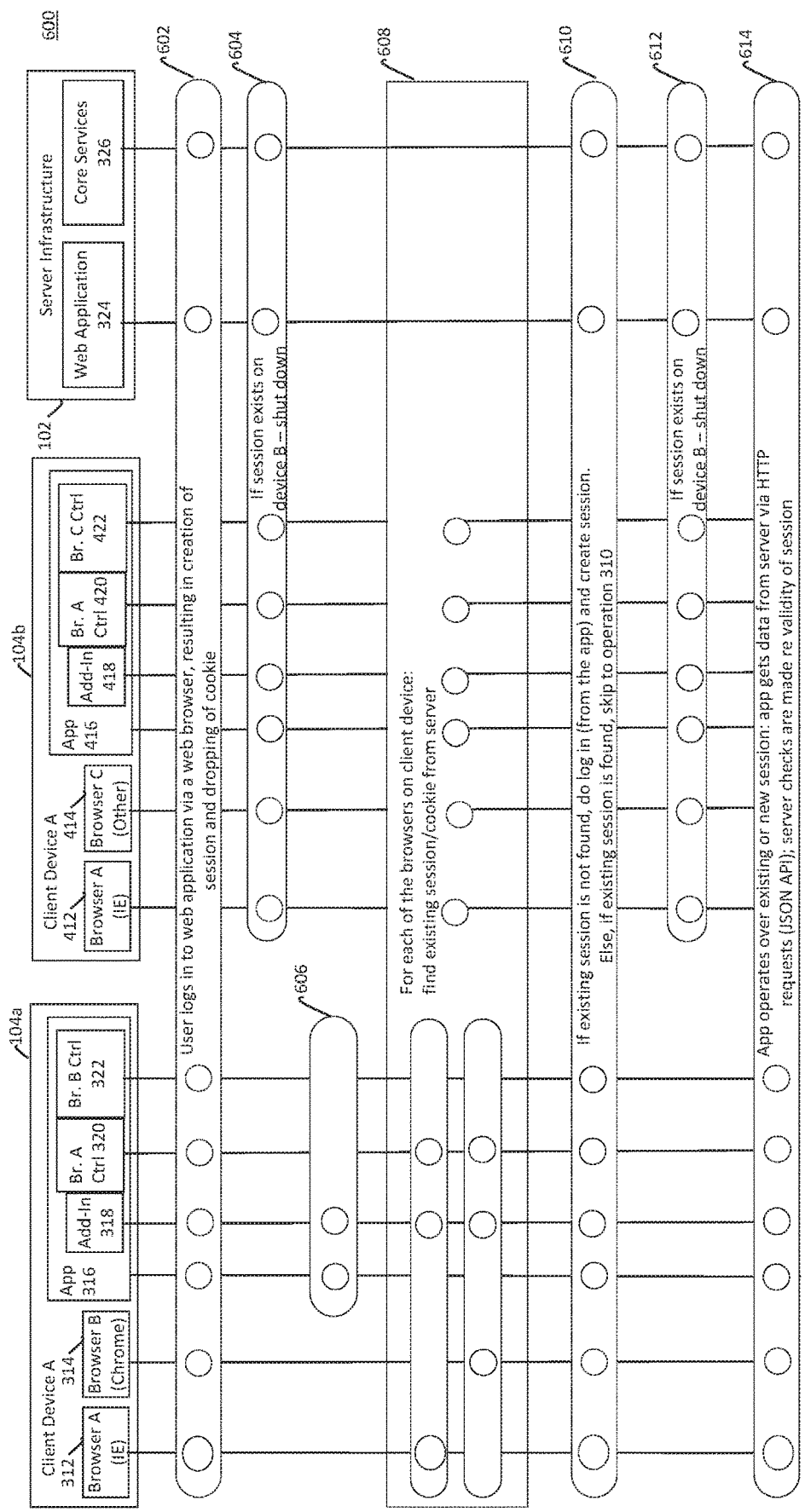
FIG. 6 illustrates a flow diagram showing interactions between client devices and a server device when a single sign-on operation is followed by a multiple login prevention, according to some example embodiments.

FIG. 6 illustrates interactions between client 104a, client 104b and a server infrastructure 102 showing SSO and MLP in a combined series of interactions, according to some example embodiments.

Process 600 may be commenced when the user navigates the page the browser to a so-called landing page for the web application. The navigation may be performed by entering a URL for the landing page, or by clicking on a corresponding link from another web page.

At operation 602, a user on client 104a signs-in to web application 324 via browser 312. The sign-on process may be performed in accordance with FIGS. 5A-5B discussed above. As described in relation to operation 302 of FIG. 3, a new session is created for the user to interact with web application 324, and one or more corresponding cookies may be generated.

At operation 604, any active sessions the user has from client 104b are deactivated or removed. For example, as part of the new session setup at operation 602, any sessions the same user has from other clients are deactivated. Deactivation may include marking a session table to indicate that one or more sessions are not active or altogether removing such sessions from the session table.

If client 104b had an active session ongoing at the time of operation 602, the entry in the session table for that session would be removed or marked as inactive. After such removal or marking as inactive, any subsequent requests for data by the client 104b to web application 324 will be unsuccessful because the session validity check on the server side in response to each data request will fail for not finding an active session associated with the user and the client 104b for the web application. This illustrates an implementation of MLP.

At operation 606, app 316 on client 104a starts up. The processing associated with this operation is similar to that described in association with operation 304 of FIG. 3.

At operation 608 the app determines existing sessions. The processing associated with this operation is similar to that described in association with operation 306 of FIG. 3.

Figure 7:
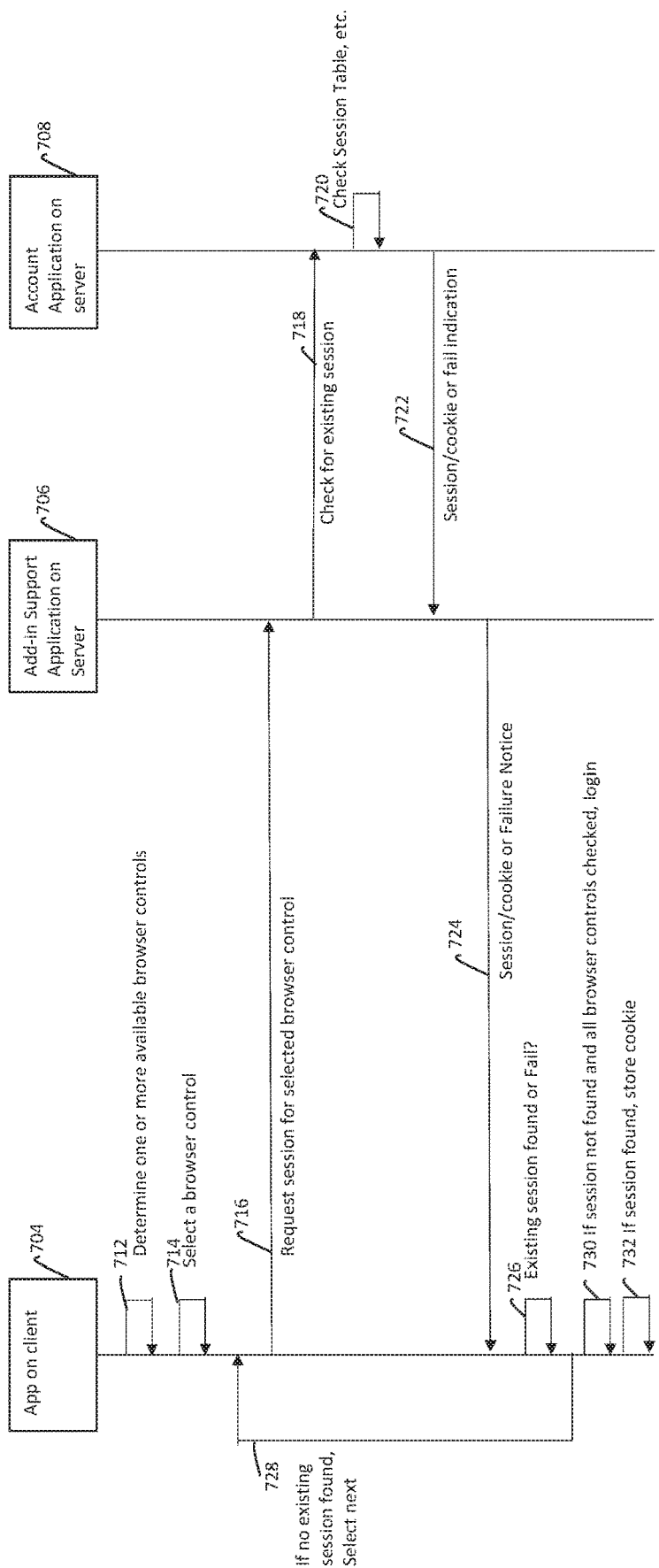
FIG. 7 illustrates a process used by a native app upon startup to sign-on to a web application, according to some example embodiments.

FIG. 7 illustrates a process 700 performed by an app running on a client and server processes running on one or more servers in order to enable the user to access a web application via the app, according to some embodiments.

Process 700 may be started when app 704 (e.g., the native app 316 described above for accessing the web application 324), starts up on a client (e.g., client 104a). Upon startup, at operation 712, a custom add-in (e.g., add-in 318) in the app 704 determines the browser controls available for use. According to some embodiments, a predetermined ordered list of browser controls may be considered to represent the browser controls available for use. In some other embodiments, browsers available on the client are automatically discovered.

At operation 714, a first browser control is selected. In some embodiments, for example, the browser control appearing first in the ordered list is selected. In an example embodiment, an Internet Explorer browser controller is selected as the first choice when the app includes an Excel program because, for example, it is expected that a high level of compatibility exists between the Internet Explorer browser controller and the Excel program.

At operation 716, a request for an existing session is sent to the server. The request indicates at least the selected browser control, the web application to which access is requested, user Id, and client identification.

The request may be sent to a predetermined designated web address. For example, an enterprise may configure an application on the server at the predetermined designated web address in order to support the processing performed by a custom add-in incorporated into the app.

At operation 718, a web server 706 at the designated web address received the request sent by the client. The web server 706 (perhaps in conjunction with an app server, database and/or other process) transmits a message to another application requesting information regarding any existing sessions corresponding to the request received from the client. The web server 706 and the other application may, in some embodiments, be applications in core service 114.

At operation 720, the other application 708, which may be an account management application running on server 102, receives the request. Application 708 may check a session table or other data structure by which existing sessions are maintained for an existing session that corresponds to the parameters specified in the received request. The parameters specified in the received request may include identification for the type of browser (or the selected browser control noted above), user, client and requested web application.

If an existing session is found, a cookie associated with that existing session is accessed. As described above in relation to FIG. 2, each existing session may have an associated cookie.

At operation 722, if no session was found, application 708 responds to application 706, indicating the failure to find a session.

Otherwise, if a session was found, at operation 722, application 708 responds to application 706 by providing information about the existing session and/or a copy of the accessed cookie.

At operation 724, application 706 transmits a response to the app 704 based upon the response received from application 708. Thus, if an existing session was found at operation 720, then information about the existing session and/or a copy of the cookie corresponding to the existing session is included in the response to app 704. If at operation 720, no existing session was found, the response informs app 708 of the failure to find an existing session for the currently chosen browser control.

At operation 726, the app 704, based upon the latest response received from add-in support application 706, determines whether an existing session was found or not.

If no existing session was found, app 704 attempts to select the next browser control from the one or more browser controls determined at operation 712. Then, if another browser control exists which has not yet been tested for existing sessions, at operation 728, another browser control for which existing sessions are to be determined is selected and processing proceeds to operation 716. At operation 716, the request may now be generated including the newly selected browser control, and processing may proceed to operation 718.

If, at operation 726, it was determined that no existing session was found and no other browser controls remain to be tested for existing sessions, then at operation 730, it is determined that no session from the client currently exists for the web application to be accessed, and the app 704 can perform to sign-on.

The sign-on may include the app 704 transmitting an HTTP request to the predetermined address of the web application. FIG. 5 illustrates an example process that occurs when a browser running on a client is signing on. A similar process (i.e., a similar sequence of operations) may be performed by the server infrastructure and the app on the client when the app is signing in. During the sign-on process, when, for example, the app 704 receives the prompt for login (shown as being sent from core services 526), a login window be displayed for the user to enter login credentials. The login window in an app, according to some embodiments, is described below in relation to FIG. 9. When the app signs-in first before any sessions are created for a browser on the client, a new session will be created, which the app may use for interaction with the web application.

If, on the other hand, an existing session is found, then at operation 732, the cookie received in the response from add-in support application 706 is stored in storage accessible to the app. Subsequent requests to the web application may include the cookie, thus enabling the web application to service the app 704 using an already existing session and without requiring that the user perform a separate sign-on through the app.

In some embodiments, yet more operations may be performed by the app 704 before it begins accessing application data provided by the web application. In some embodiments, after operation 732 (e.g., after an existing session is found and a cookie with which to access the web application is received by the app), app 704 instantiates another browser control and proceeds to access the web application using the found existing session (e.g., using the previously obtained cookie) and the newly instantiated browser control. This capability allows for a cookie to be shared across browsers (e.g., cross-browser). For example, in a situation where the cookie is obtained from the server for the Chrome browser, but the app may require certain features available in another type of browser controller (e.g., Internet Explorer browser controller), the app may use the already obtained cookie with a newly instantiated other type of browser controller.

Figure 8:
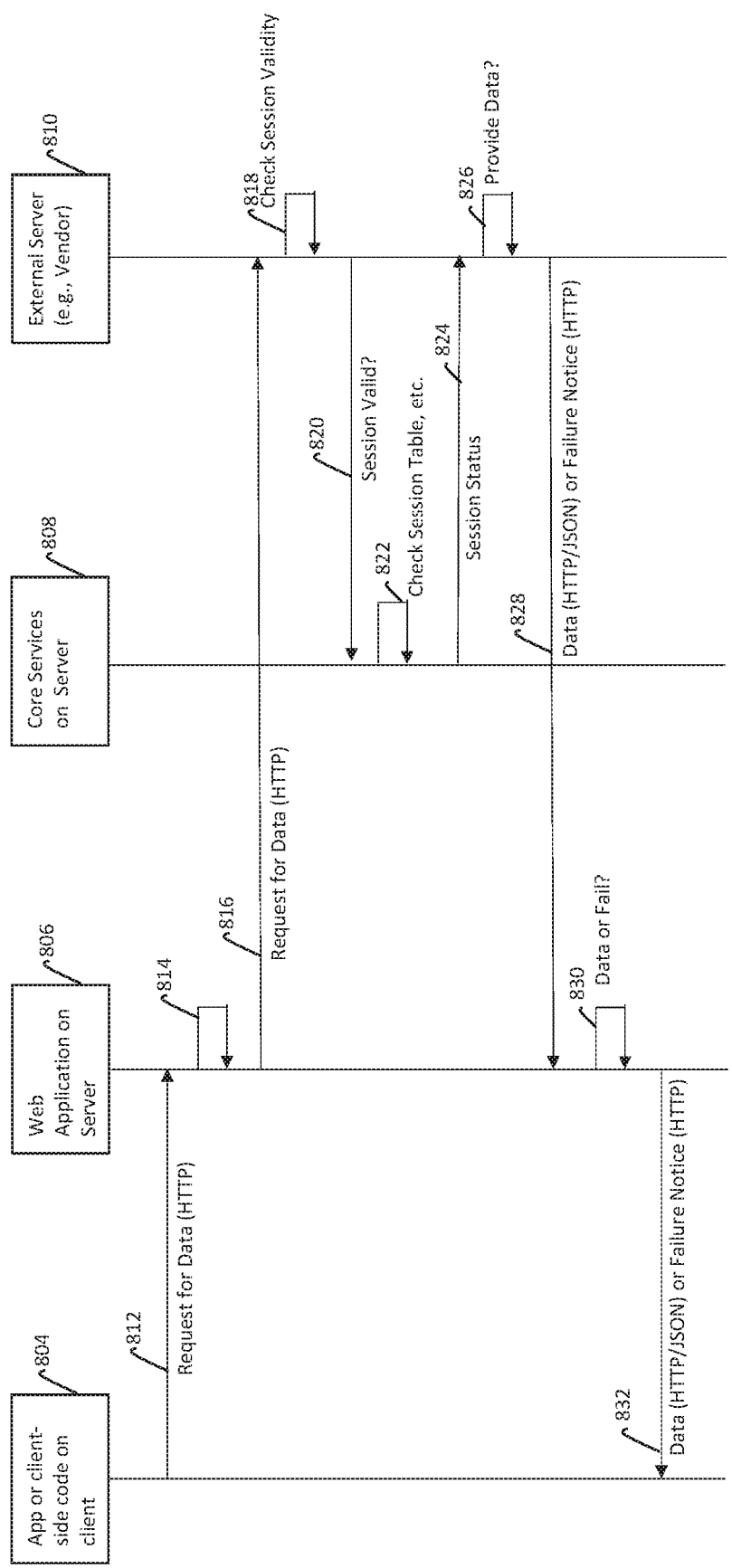
FIG. 8 illustrates a flowchart of interactions for a client request for data, according to some example embodiments.

FIG. 8 illustrates a process 800 for an app or client-side code on a client 804 to access data from an external server 810, according to some example embodiments.

Process 800 may be entered after an app or client-side code on client 804 has signed-on to the web application, and when the access to data from an external server is required by the app of client-side code on the client.

At operation 812, client 804, transmits a request for data to the web application 806 on server 102. The request may include a cookie which was previously obtained for the session and stored in the client. The request would indicate the data requested.

At operation 814, the web application 806 receives the request from the client 804. Processing at operation 814 may include determining from where to obtain the requested data. The processing may also include locally determining at least some of the requested data.

At operation 816, the web application transmits the request for data to the external server as determined at operation 814 and/or as specified in the request from client 804.

At operation 818, the external server 810 receives the request. In some embodiments, the processing at operation 818 may include checking a locally maintained table for a valid session. The check may be based upon a cookie and/or user identifying information from the request. If the check from the locally maintained table indicates that the user is authorized to receive the data, then processing may proceed to operation 826 in order to provide the requested data.

In some other example embodiments, in addition to or in place of checking the locally maintained table, at operation 820, the external server transmits a request to core services 808 requesting for confirmation of the request for data.

At operation 822, the core services application 808 checks the session table and/or other data structure to determine if the data request is authorized.

At operation 824, a status is reported to the external server.

At operation 826, based at least upon whether the request for data is properly authorized determines to provide the data to the client. Alternatively, if it was determined that the request was not properly authorized, then a determination is made to not provide the data.

At operation 828, a response is transmitted to the web application 806 based upon whether the data is to be provided to the client or not. The response may either include the requested data or include a failure notice.

At operation 830, the web application determines, whether the client's request has succeeded or failed.

At operation 832, the web application transmits a response to the client.

Figure 9:
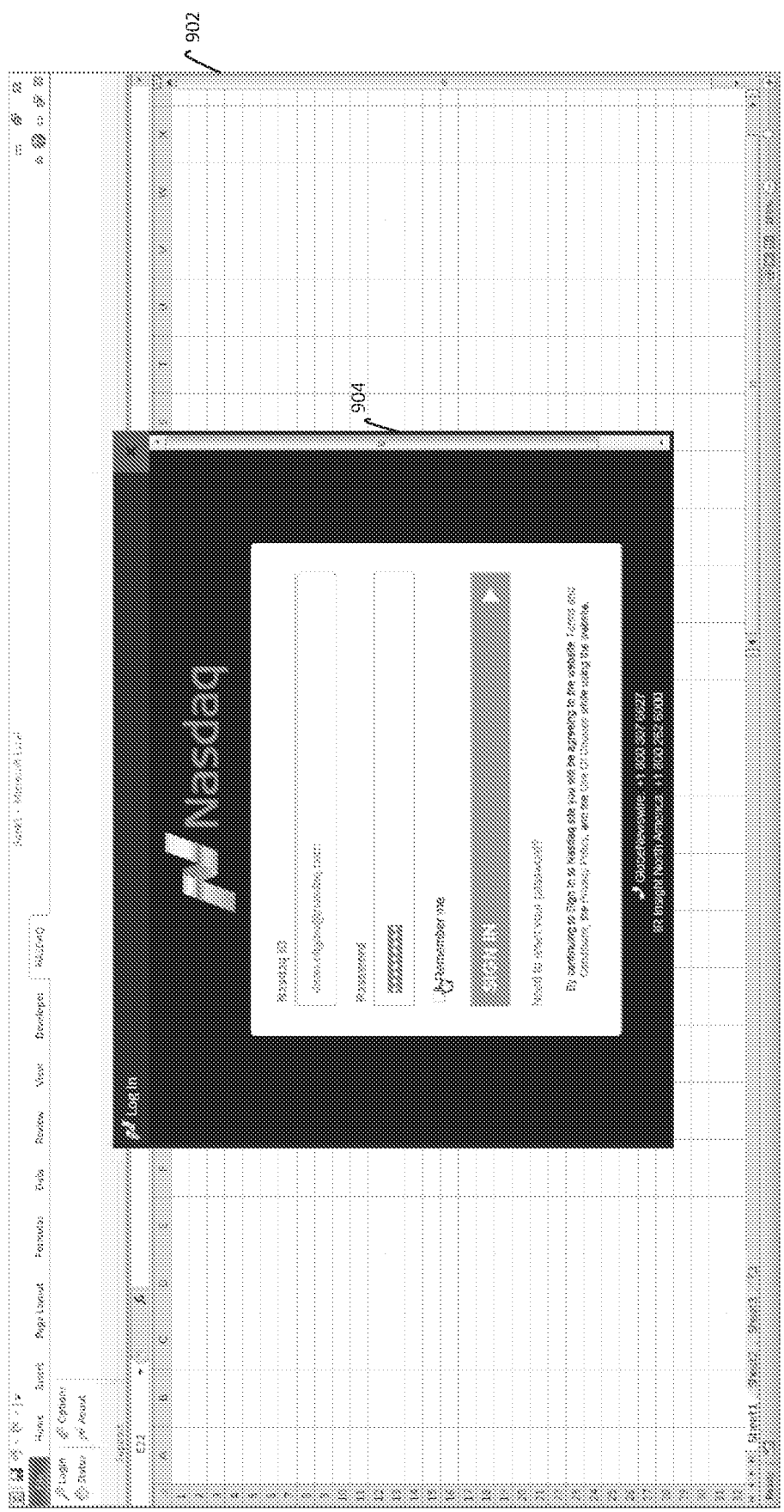
FIG. 9 illustrates a sign-on window presented superimposed on a native app on a client device, according to some example embodiments.

FIG. 9 illustrates an example implementation of the login window provided to the user from within an app, such as apps 120*a* or 120*b*. For example, while app 120*a* is running (as shown in window 900), if it is determined that the user on client 104*a* needs to be newly signed in, then a login window 902 is displayed in order to receive the user's login credentials.

Figure 10:
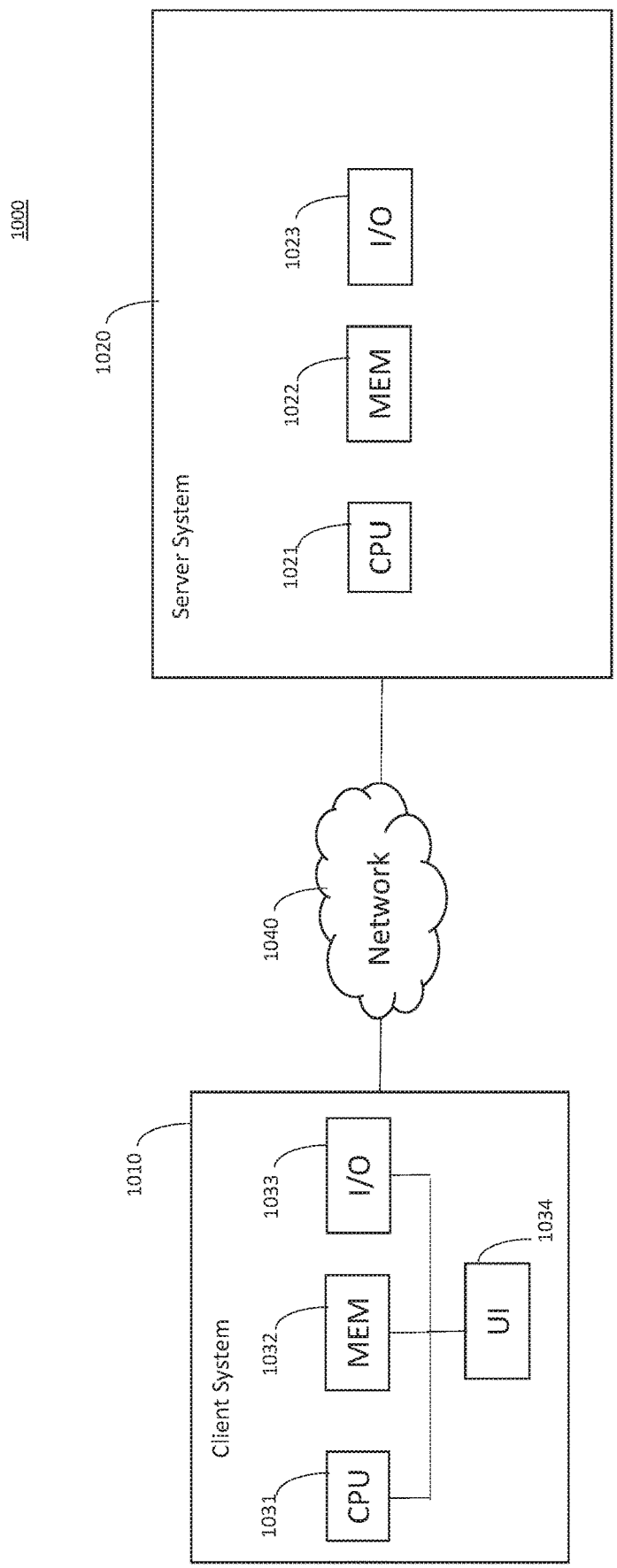
FIG. 10 schematically illustrates a computing environment in which the client devices and/or servers can be implemented, in accordance with some example embodiments.

FIG. 10 shows a non-limiting example block diagram of a hardware architecture for the system 100. In the example shown in FIG. 10, the client system 1010 communicates with a server system 1020 via a network 1040. The network 1040 could comprise a network of interconnected computing devices, such as the internet. The network 1040 could also comprise a local area network (LAN) or could comprise a peer-to-peer connection between the client system 1010 and the server system 1020.

The example client system 1010 and server system 1020 could correspond to clients 104 and server 102 as shown in FIG. 1. That is, the hardware elements described in FIG. 10 could be used to implement the various software components and actions shown and described herein with reference to FIG. 1. For example, the client system 1010 in FIG. 10 could include at least one processor CPU 1031, at least one memory 1032, at least one input/output device I/O 1033, and a component for generating and displaying a user interface UI 1034. The at least one memory 1032 may include a computer readable storage medium such as, for example, random access memory (RAM), static RAM, flash memory, magnetic disk. The I/O device 1033 can be all encompassing and could include a communication device, such as a transceiver for sending and receiving data (e.g., a wireless transceiver, a wired transceiver). I/O device 1033 could also include an interface for connecting a non-transitory computer readable storage medium to the client system 1010 to send and receive data.

It should be appreciated that the combination of elements in client system 1010 could be used to implement the example web browser applications 118, 117 and app 120*a* in FIG. 1. For example, the memory 1032 could load the files associated with the application (e.g., HTML, XML, JavaScript files) and the CPU 1031 could be used to execute instructions associated with the application. The I/O device 1033 could be utilized to fetch the various elements comprising the SPA from the server system 1020 and/or to interact with the user.

Server system 1020 also comprises various hardware components used to implement the software elements for server 102 as shown in FIG. 1 or 200 in FIG. 2. For example, server system 1020 could also include hardware components of at least one processor CPU 1021, at least one memory 1022, and at least one input/output device I/O 1023. The at least one memory 1022 may include a computer readable storage medium such as, for example, random access memory (RAM), static RAM, flash memory, magnetic disk. The I/O device 1023 can be all encompassing and could include a communication device, such as a transceiver for sending and receiving data (e.g., a wireless transceiver, a wired transceiver). I/O device 1023 could also include an interface for connecting a non-transitory computer readable storage medium to the server system 1020 to send and receive data. In one example embodiment, I/O device 1033 of the client system can perform communication via the network with I/O 1023 of the server system.

Similar to client system 1010, the server system 1020 could implement and/or execute the applications. For example, the memory 1022 could be used to store the information in database 110 as well as the components and files utilized by web servers and application servers associated with, for example, the web applications 112 and core services 114. The CPU 1021 could be used in executing the software necessary to generate the respective modules that are requested by and transmitted to the client system 1010. For example, CPU 1021 could be used to generate the necessary modules created by an application server. Likewise, I/O device 1023 can be used by a web server to transmit the different application elements to the client system 1010. Of course, these examples are non-limiting and the system envisions utilizing the hardware elements in a variety of aspects.

The technology described above in relation to the described SSO and MLP provides, among other things, capabilities to improve the efficiency with which users interact with web applications over communications networks, while also reducing misuse of the web application's resources. As described in more detail above, some embodiments may be used to control user access to various networked resources so that overall specifications of use for those resources are adhered to.

In the examples described herein, for purposes of explanation and non-limitation, specific details are set forth, such as particular nodes, functional entities, techniques, protocols, standards, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits (e.g., as shown in FIG. 10), using software programs (e.g., as shown in FIG. 1) and data in conjunction with a suitably programmed microprocessor or general purpose computer, using applications specific integrated circuitry (ASIC), and/or using one or more digital signal processors (DSPs). The software program instructions and data may be stored on computer-readable storage medium and when the instructions are executed by a computer or other suitable processor control, the computer or processor performs the functions. Although databases may be depicted as tables below, other formats (including relational databases, object-based models, and/or distributed databases) may be used to store and manipulate data.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the technology, and does not imply that the illustrated process is preferred.

Various forms of computer readable media/transmissions may be involved in carrying data (e.g., sequences of instructions) to a processor. For example, data may be (i) delivered from a memory to a processor; (ii) carried over any type of transmission medium (e.g., wire, wireless, optical, etc.); (iii) formatted and/or transmitted according to numerous formats, standards or protocols, such as Ethernet (or IEEE 802.3), ATP, Bluetooth, and TCP/IP, TDMA, CDMA, 3G, etc.; and/or (iv) encrypted to ensure privacy or prevent fraud in any of a variety of ways well known in the art.

When it is described in this document that an action "may," "can," or "could" be performed, that a feature or component "may," "can," or "could" be included in or is applicable to a given context, that a given item "may," "can," or "could" possess a given attribute, or whenever any similar phrase involving the term "may," "can," or "could" is used, it should be understood that the given action, feature, component, attribute, etc. is present in at least one embodiment, though is not necessarily present in all embodiments.

While the technology has been described in relation to AngularJS, this is done for ease of description; it is to be understood that the technology described in this document is applicable in the context of other SPA technologies, other web technologies, and/or any other software technology.

While the technology has been described in connection with what is presently considered to be the most practical and preferred embodiment, it is to be understood that the technology is not to be limited to the disclosed embodiment, but on the contrary, is intended to cover various modifications and equivalent arrangements.

The invention claimed is:

1. A system comprising at least one client device, and at least one server device executing a server-side portion of a web application,
    the at least one client device including a first processing system having at least one hardware processor, the first processing system being configured to execute a first client application providing a first client-side portion of the web application and a second client application providing a second client-side portion of the web application, wherein the first client application is a browser and the second client application is a native application,
    the at least one server including a second processing system having at least one hardware processor, the second processing system being configured to execute the server-side portion of the web application and to perform operations comprising:
        in response to a first access request received from the first client application, causing the first client application to perform a sign-on process prior to accessing application data provided by the server-side portion of the web application;
        generating, in relation to the performed sign-on process, a first session, wherein the first client application is subsequently provided access to said application data using the first session;
        when a second request is received from the second client application, determining, using at least one characteristic of the second request, whether the first session is useable by the second client application to access said application data;
        in the event that it is determined that the first session is useable by the second client application to access said application data, providing the second client application with access to the application data using the first session;
        in the event that it is determined that the first session is not useable by the second client application to access said application data, causing the second client application to perform a sign-on process prior to accessing the application data, and subsequent to the second client application performing the sign-on process, providing the second client application access to the application data using a second session generated in relation to the sign-on process performed by the second client application;
        generating, in relation to a sign-on by an instance of either the first client application or the second client application executing on another client device, a third session, wherein said instance is subsequently provided access to said application data using the second session; and
        in response to generating the third session, deactivating the first session.

2. The system according to claim 1, wherein the at least one characteristic includes an identifier included in the second request.

3. The system according to claim 1, wherein the determining includes determining whether a value corresponding to the identifier is stored in a memory of the at least one server device in association with at least one of a plurality of session records.

4. The system according to claim 3, wherein the determining further comprises:
    identifying a corresponding previously stored entitlement associated with the web application, wherein the entitlement specifies restrictions on accessing data from a service external to the server device,
    wherein the determining is further based upon the identified entitlement.

5. The system according to claim 1, wherein the first processing system is further configured to:
    determine, by the second client application, one or more candidate browser controls for use by the second client application to communicate with the server-side portion of the web application, wherein each of the one or more candidate browser controls is configured to enable the second client application, which is not a browser, to communicate using protocols including HTTP in accordance with a respective browser type;
    transmitting by the second client application to the server device, a first instance of the second request, wherein the first instance corresponds to a first selected one of the one or more candidate browser controls; and
    based upon a response received to the transmitted first instance of the second request, determining, by the second client application, whether to transmit a second instance of the second request, wherein the second instance corresponds to another one of the one or more candidate browser controls.

6. The system according to claim 5, wherein (a) when a browser type of the first client application is the same as a browser type of the first selected one of the one or more candidate browser controls, the response received indicates a presence of the first session, and (b) when the browser type of the first client application is different from the browser type of the first selected one of the one or more candidate browser controls, the response received represents a failure to find an existing session usable by the second client application.

7. The system according to claim 6, the first processing system is further configured to:
when the response received indicates the presence of the first session, and a browser type of a currently selected one of the one or more candidate browser controls is different from a predetermined browser type, obtain a first session identifier that is included in the response;
instantiate a browser control of the predetermined browser type; and
access the application data using the instantiated browser control of the predetermined browser type and using the first session identifier.

8. The system according to claim 7, wherein the first processing system is further configured to:
after having transmitted one or more instances of the second request, in relation to a response received for an instance of the second request, performing a sign-on by the second client application.

9. The system according to claim 8, wherein the second processing system is further configured to:
in response to receiving an instance of the second request, determine whether the first session corresponds to a browser type currently associated with the second request;
if the determining determines that the first session corresponds to a browser type currently associated with the second request, returning to the second client application a first session identifier associated with the first session; and
if the determining determines that the first session does not correspond to the browser type currently associated with the second request, returning to the second client application an indication that no session usable by the second client application was found.

10. The system according to claim 1, wherein the second processing system is further configured to:
based upon the deactivating, preventing access by the first client application and the second client application to the application data.

11. A server device including at least one hardware processor configured to execute a server-side portion of a web application and to perform operations comprising:
in response to a first access request received from a first client application having a first client-side portion of the web application, causing the first client application to perform a sign-on process prior to accessing application data provided by the server-side portion of the web application, wherein the first client application is a browser and the second client application is a native application;
generating, in relation to the performed sign-on process, a first session, wherein the first client application is subsequently provided access to said application data using the first session;
when a second request is received from a second client application having a second client-side portion of the web application, determining, using at least one characteristic of the second request, whether the first session is useable by the second client application to access said application data;
in the event that it is determined that the first session is useable by the second client application to access said application data, providing the second client application with access to the application data using the first session;
in the event that it is determined that the first session is not useable by the second client application to access said application data, causing the second client application to perform a sign-on process prior to accessing the application data, and subsequent to the second client application performing the sign-on process, providing the second client application access to the application data using a second session generated in relation to the sign-on process performed by the second client application;
generating, in relation to a sign-on by an instance of either the first client application or the second client application executing on another client device, a third session, wherein said instance is subsequently provided access to said application data using the third session; and
in response to generating the third session, deactivating the first session.

12. The server device according to claim 11, wherein the at least one processor is further configured to:
responsive to receiving an instance of the second request, determine whether the first session corresponds to a browser type currently associated with the second request;
if the determining determines that the first session corresponds to a browser type currently associated with the second request, returning to the second client application a first session identifier associated with the first session; and
if the determining determines that the first session does not correspond to the browser type currently associated with the second request, returning to the second client application an indication that no session usable by the second client application was found.

13. The server device according to claim 11, wherein the at least one processor is further configured to, wherein the determining using at least one characteristic of the second request, includes determining whether a value corresponding to the identifier is stored in a memory of the at least one server device in association with at least one of a plurality of session records.

14. A method performed by a server device including at least one hardware processor, the method comprising:
executing a server-side portion of a web application;
in response to a first access request received from a first client application having a first client-side portion of the web application, causing the first client application to perform a sign-on process prior to accessing application data provided by the server-side portion of the web application, wherein the first client application is a browser and the second client application is a native application;
generating, in relation to the performed sign-on process, a first session, wherein the first client application is subsequently provided access to said application data using the first session;
when a second request is received from a second client application having a second client-side portion of the web application, determining, using at least one characteristic of the second request, whether the first session is useable by the second client application to access said application data;

in the event that it is determined that the first session is useable by the second client application to access said application data, providing the second client application with access to the application data using the first session;

in the event that it is determined that the first session is not useable by the second client application to access said application data, causing the second client application to perform a sign-on process prior to accessing the application data, and subsequent to the second client application performing the sign-on process, providing the second client application access to the application data using a second session generated in relation to the sign-on process performed by the second client application;

generating, in relation to a sign-on by an instance of either the first client application or the second client application executing on another client device, a third session, wherein said instance is subsequently provided access to said application data using the third session; and in response to generating the third session, deactivating the first session.

15. A non-transitory computer-readable storage medium, having stored thereon program instructions which, when executed by a computer of a server device, causes the server device to perform operations comprising:

executing a server-side portion of a web application;

in response to a first access request received from a first client application having a first client-side portion of the web application, causing the first client application to perform a sign-on process prior to accessing application data provided by the server-side portion of the web application, wherein the first client application is a browser and the second client application is a native application;

generating, in relation to the performed sign-on process, a first session, wherein the first client application is subsequently provided access to said application data using the first session;

when a second request is received from a second client application having a second client-side portion of the web application, determining, using at least one characteristic of the second request, whether the first session is useable by the second client application to access said application data;

in the event that it is determined that the first session is useable by the second client application to access said application data, providing the second client application with access to the application data using the first session;

in the event that it is determined that the first session is not useable by the second client application to access said application data, causing the second client application to perform a sign-on process prior to accessing the application data, and subsequent to the second client application performing the sign-on process, providing the second client application access to the application data using a second session generated in relation to the sign-on process performed by the second client application;

generating, in relation to a sign-on by an instance of either the first client application or the second client application executing on another client device, a third session, wherein said instance is subsequently provided access to said application data using the third session; and in response to generating the second session, deactivating the first session.

16. A client device including at least one hardware processor configured to execute a first client application which is a browser providing a first client-side portion of a web application and a second client application which is a native application providing a second client-side portion of the web application, and to perform operations comprising:

performing, by the first client application having transmitted a first request to a server-side portion of the web application, a sign-on to the server-side portion of the web application, and subsequent to the performed sign-on accessing application data from the server-side portion of the web application using a first session generated in relation to the performed sign-on;

determining, by the second client application, one or more candidate browser controls for use by the second client application to communicate with the server-side portion of the web application;

transmitting by the second client application to a server device on which the server-side portion of the web application is executed, a first instance of a second request, wherein the first instance corresponds to a first selected one of the one or more candidate browser controls;

based upon a response received to the transmitted first instance of the second request, determining, by the second client application, whether to access application data of the server-side portion of the web application, or to transmit a second instance of the second request, wherein the second instance corresponds to another one of the one or more candidate browser controls, and cancelling the first session in response to an indication from the server device that it has deactivated the first session, wherein (a) when a browser type of the first client application is the same as a browser type of the first selected one of the one or more candidate browser controls, the response received indicates a presence of the first session, and (b) when the browser type of the first client application is different from the browser type of the first selected one of the one or more candidate browser controls, the response received represents a failure to find an existing session usable by the second client application.

17. The client according to claim 16, the at least one hardware processor is further configured to:

when the response received indicates the presence of the first session, and a browser type of a currently selected one of the one or more candidate browser controls is different from a predetermined browser type, obtain a first session identifier that is included in the response;

instantiate a browser control of the predetermined browser type; and access the application data using the instantiated browser control of the predetermined browser type and using the first session identifier.

* * * * *